UNITED STATES PATENT OFFICE.

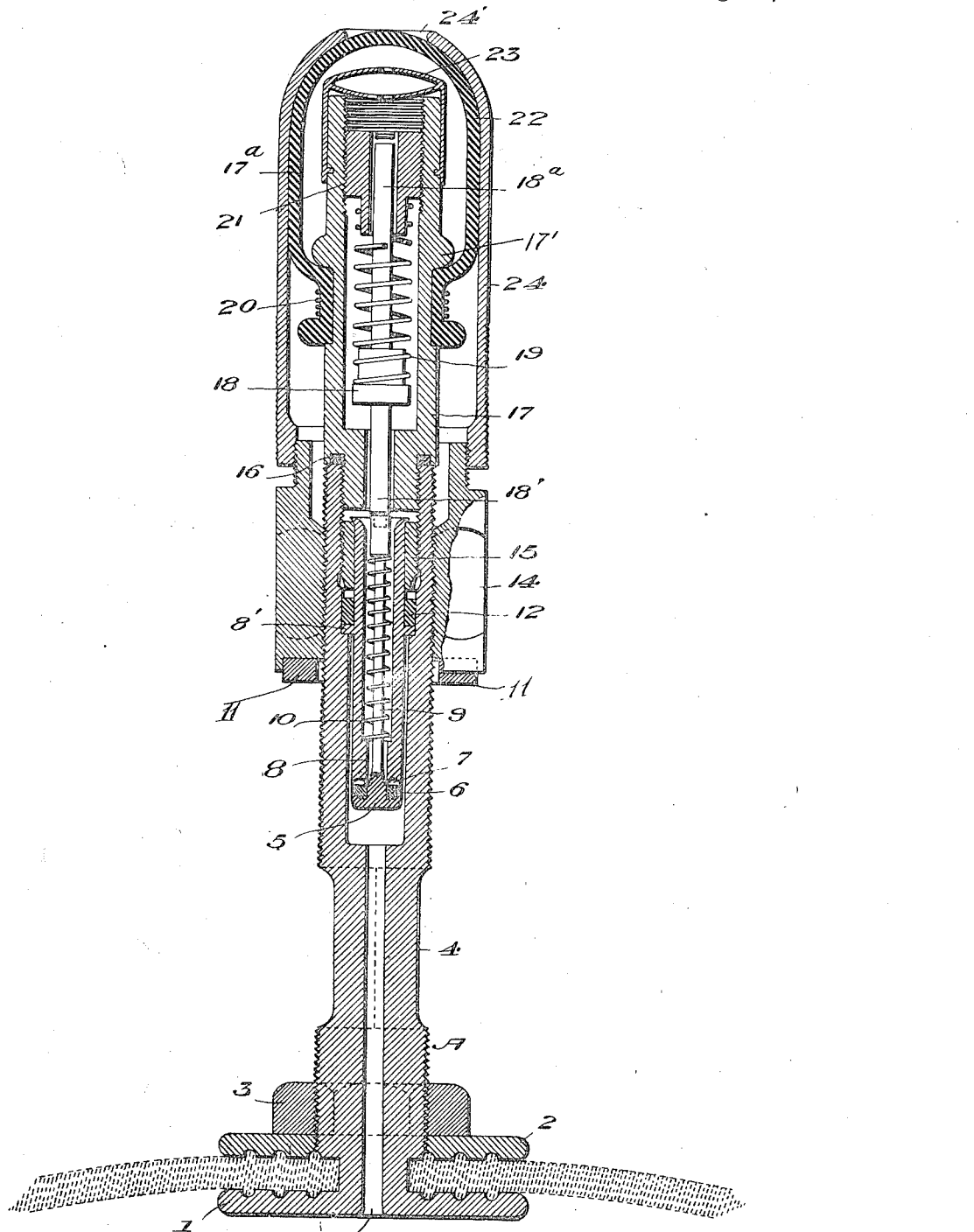

WILLARD F. DOWNS, OF BAY SHORE, NEW YORK.

TIRE VALVE AND SIGNAL.

1,236,411.      Specification of Letters Patent.      Patented Aug. 14, 1917.

Application filed January 26, 1917. Serial No. 144,619.

*To all whom it may concern:*

Be it known that I, WILLARD F. DOWNS, a citizen of the United States, residing at Bay Shore, Long Island, in the county of Suffolk and State of New York, have invented certain new and useful Improvements in Tire Valves and Signals, of which the following is a specification.

My invention relates to automobile tube and tire signals wherein the signaling features are associated with the inlet-valve of the tube; a leading object of the invention being to provide a warning signal, of an audible character to indicate to the operator of the automobile when the tire of his machine becomes deflated; or when the pressure within the tire becomes reduced to such a degree that the further use of the tire in its then existing condition will subject the tire to further damage.

With the above and other objects in view, my invention consists, essentially, in improved means for automatically giving an audible duplex signal of the collapse of a tire, or of the substantial deflation of the tire. The invention also consists of the parts and the constructions, arrangements and combinations of parts which I will hereinafter describe and claim.

In the accompanying drawings forming part of this specification, the figure represents a longitudinal sectional view of an inlet valve for a penumatic tire embodying my improvements.

It is within the knowledge of the operators of horseless and other vehicles employing pneumatic tires, that the tire is in danger of material structural injury when it is used in a deflated condition, or when the air pressure within the tire is reduced to such an amount that the tire becomes substantially flat. The trouble incident to the above condition is of such importance that good practice requires that a tire which will not properly hold air should be removed, and repaired or replaced by another tire, and yet it frequently happens that a vehicle will be driven for a considerable distance after deflation of the tire before the condition of the tire is made known to the operator of the machine.

In the accompanying drawing, 1 and 2 represent the spaced plates or disks which are usually clamped upon opposite sides of the inner tube of a pneumatic tire, the disk or plate, 1, being usually an integral portion of the casing, A, of the inlet valve through which the medium by which the tube is inflated is supplied; the disk or plate, 2, being usually in the form of a loose washer and being appropriately backed by and clamped in place by a nut, 3, operating upon a suitable thread formed on the valve casing.

The valve casing is threaded for the greater portion of its length, but in an intermediate portion I prefer to form it without threads and with a many-sided surface, 4, to thereby adapt the tube for the reception of a wrench or like tool by which the casing and the parts associated therewith may be appropriately screwed one relatively to the other.

The valve casing, A, has the usual opening, $a$, through it for the passage of air and in an enlarged bore of this passage there is placed a cage, 8, or valve casing which carries the controlling valve, the stem, 9, of which is encircled by a spring, 10, adapted to assist the seating of the valve or head, 5, on the inner end of said stem, said head carrying a washer or packing, 6, which is adapted to bear against the inner end of the cage, or casing, 8, and which end is appropriately fashioned to form a seat for the valve. In the present instance, the valve seat which is formed on the inner end of the cage, or casing, 8, has a concaved face or it may be provided with an annular groove forming a double-face valve seat. The valve cage, or casing, has intermediate of its length a flange or collar, 8′, which is adapted to seat against a shoulder formed in the valve casing and supporting a washer, 12, by which a close joint is formed between the cage, or casing and the inner wall of the chamber in which it operates.

At its outer end the valve casing is also internally threaded to receive a screw-sleeve, 15, which is thus adjustably mounted, said sleeve being open at its center to admit the outer end of the valve cage, or casing, 8, and which end may be flared slightly over the outer end of the sleeve to thereby unite one of these parts with the other.

Alined with the valve casing and forming an extension thereof, is a cage or casing, 17, the inner end of which is externally threaded and enters the outer end of the valve casing and screws into engagement with the interior thereof, the inner end of the cage or casing, 17, terminating a short distance above the outer end of the screw sleeve, 15, and the said cage or casing, 17, carrying a packing or washer, 16, to seat tightly against the outer end of the valve casing.

The interior of the cage or casing, 17, has an opening or passage of two diameters, and in the smaller of these diameters operates a rod, 18', which projects from the inner face of the plunger, 18, said plunger having a rod, 18ª, extending outwardly and being surrounded by a spring, 19, which is confined between the outer surface of the plunger and the inner surface of an adjusting screw, 21, and which adjusting screw is mounted for movement in the outer threaded end of the plunger cage or casing, 17. By this means, the tension of the spring, 19, may be adjusted to any desired extent and to substantially accord with the tire pressure, and the adjustment may be maintained because of the threaded connection on the interior of the cage or casing, 17.

The cage or casing, 17, is provided with an enlargement or collar, 17', and over this is stretched or placed the inner open end of a rubber or like sheath, or bulb, 17ª, and which may be secured to the plunger cage, 17, by a wrapping or cord or the like, as shown at 20. This rubber bulb or sheath incloses a signaling device, shown in the form of a whistle, 23, which is carried on the outer end of the cage or casing, 17, the arrangements and fitting of the parts being such that the interior of the rubber bulb or sheath is subjected to the pressure of the air within the inner tube of the tire when this pressure is reduced sufficiently to allow the spring actuated valve, 5, to uncover the seat, 7, and permit the air within the tire to escape past the seat and through the cages, or casings, 8 and 17, and the aperture through the whistle, into the bulb or sheath.

Mounted on the threaded valve casing is a many-sided nut, 14, whose inner face is recessed to receive a suitable washer, 11, which is designed to be clamped against the inside of the felly of the rim, as will be well understood in the art, said nut having its outer end reduced and externally threaded and engaged by threads on the interior of the cap, 24, which incloses the rubber bulb and its contained parts and resists the internal pressure of the same except that in the end of the cap, 24, there is an aperture, 24', through which the outer end of the rubber bulb is exposed and unsupported at this point.

From the foregoing it will be understood that the inner tube is securely clamped between the disks, 1 and 2, the surfaces of which may be indented or recessed at numerous points to prevent relative movement of the disks or plates, and that the valve casing, A, extends as usual from the plate or disk, 1, and that it has an intermediate portion, 4, made many-sided for the application of a wrench or like tool to facilitate the attachment of the aforesaid parts to the tube. The seat against which the valve, 5, closes being formed with an annular groove, 7, or the like, there exists practically two comparatively sharp edges against which the washer, 6, closes, the seats being designed to embed slightly into the washer so that if one seat should leak, the other will hold and thus insure a tight joint between these contacting parts. The advantage of this is that the valve will seat square on its seat and will not stick or catch and at the same time it will remain air tight.

The described construction will be found efficient to prevent a tire from collapsing or deflating and contacting with the rim with the possibility that the fabric of the shoe will be cut through and a puncture or leak result, without the driver of the car having knowledge of the same. To make this more manifest I will assume that the tire is designed to carry 80 pounds pressure, in which case, the valve, 5, will be so adjusted as to yield or open at say a 20, 30 or 50 pound pressure as desired. Under such conditions and while the tire is in operation, if said tire should be subjected to a puncture or from any other cause the pressure in the tire should become so low that the tire is in danger of being cut or ruined because of the excessive deflation, the valve will open, say under the influence of the now superior pressure of the spring 19 and rod 18' and the air in the tire will now rush past the valve seat and through the valve and plunger casings, 8 and 17, respectively, and through the apertured whistle and into the rubber bulb or sheath, 22, which becomes inflated until it finally ruptures or bursts. The bursting of the bulb or sheath, 22, produces a more or less loud report which will make the condition of the tire noticeable to the operator of the machine, but if the noise thus made is not sufficient to attract the attention of the operator, or if he should disregard the signal given and continue to run the vehicle, there will be produced the further signal due to the air escaping through the whistle, 23, which continues to sound until the air in the tire is substantially exhausted.

The arrangement is such that the parts can be adjusted to give the necessary signals at any pressure in the tire, from 10 to 50 pounds, as will be well understood.

In operation, and assuming that the automatic features comprising the plunger casing, 17, and its associated parts and the exterior cap, 24, have been removed, so as to allow the attachment on the end of the hose which supplies the compressed air to be properly connected to the valve casing and to unseat the valve, 5, as usual, the air is admitted until the pressure in the tire reaches the desired amount and the back pressure immediately seats the valve, as soon as the supply hose is removed. The whistle and the rubber bulb having been removed from the plunger casing, 17, this casing is then screwed into engagement with the outer end of the valve casing and until the washer, 16, firmly seats and a tight joint is formed thereabout. Then the adjusting screw, 21, and which is accessible through the open outer end of the plunger casing, is screwed down thereby increasing the tension of the spring, 19, until the pressure of this spring upon the projecting rod of the plunger, 18, by its contacting with the valve stem, overcomes the tire pressure and slightly removes the valve from its seat thus allowing the air to escape and to thereby indicate the tension at which the spring, 19, should be set. After adjusting the parts as described, the automatic signaling features are removed from the valve casing and the inner tube inflated in the usual manner to working pressure and the whistle is then applied to the outer end of the plunger casing and the rubber sheath or bulb is applied to this casing and the exterior cap, 24, then applied over the whole and screwed into position, when the parts are installed for automatic operation, as before explained.

Having thus described my invention what I claim as new and desire to secure by Letters Patent is:—

1. The combination with a pneumatic tire inflation valve and the casing thereof, of a low-pressure signal device associated with the valve casing having means for unseating said valve when the tire pressure falls below a predetermined amount, a flexible envelop forming a receiver for escaping tire air, and external means reinforcing a portion of the envelop and leaving another portion of said envelop devoid of reinforcement and adapted to be ruptured by the pressure of escaping air so as to give an audible signal.

2. The combination with a pneumatic tire inflation valve and the casing thereof, of a low-pressure signal device associated with the valve casing having means for unseating said valve when the tire pressure falls below a predetermined amount, and a flexible bulb forming a receiver for escaping tire air, said bulb adapted to be ruptured by its contained air pressure so as to give an audible signal, and a removable cap inclosing said bulb and having an opening through which a portion of the bulb is exposable.

3. The combination with a pneumatic tire inflation valve and the casing thereof, of a low-pressure signal device associated with the valve casing having means for unseating said valve when the tire pressure falls below a predetermined amount, and a flexible bulb forming a receiver for escaping tire air, said bulb adapted to be ruptured by its contained air pressure so as to give an audible signal and a threaded cap reinforcing the bulb, an end portion of the cap being removed so as to leave a corresponding portion of the bulb unsupported.

4. The combination with a pneumatic tire inflation valve and the casing thereof, of a low-pressure signal device associated with the valve casing having means for unseating said valve when the tire pressure falls below a predetermined amount, and a flexible bulb forming a receiver for escaping tire air, said bulb adapted to be ruptured by its contained air pressure so as to give an audible signal, and a whistle forming a part of the signal and subjected to escaping tire air adapted to give a continuous audible signal after the bulb has been destroyed.

5. The combination with a pneumatic tire inflation valve and the casing thereof, of low-pressure signaling devices associated therewith, said devices comprising a casing connected to the outer end of the valve casing and having a spring pressed plunger alined with said valve, and an armored inflatable bulb on the outer end of the plunger casing having an unarmored portion adapted to be ruptured by air escaping through the valve casing from a leaky tire.

6. The combination with a pneumatic tire inflation valve and the casing thereof, of low pressure signaling devices associated therewith, said devices comprising a casing connected to the outer end of the valve casing and having a spring pressed plunger alined with said valve, and an inflatable bulb on the outer end of the plunger casing adapted to be ruptured by air escaping through the valve casing from a leaky tire, and a whistle on the end of the plunger casing interior to the bulb adapted to give a continuous audible signal after the bulb has been destroyed.

7. The combination of a pneumatic tire inflation valve and the casing thereof, of low-pressure signaling devices associated therewith, said devices comprising a casing connected to the outer end of the valve casing and having a spring pressed plunger alined with said valve, an inflatable bulb on the outer end of the plunger casing adapted to be ruptured by air escaping through the valve casing from a leaky tire, a whistle on the end of the plunger casing interior to the bulb adapted to give a continuous audible signal after the bulb has been destroyed, and a removable cap inclosing and reinforcing the inflatable bulb and having an opening through which a portion of the bulb is exposable and unsupported.

8. The combination with a pneumatic tire inflation valve and the casing thereof, of low pressure signaling devices associated with the valve and comprising a casing connected to the outer end of the valve casing, a plunger operable in its casing in line with the valve and adapted to actuate the latter when the tire pressure falls below a predetermined amount, a spring for operating the plunger, a screw nut on the plunger casing for adjusting the tension of the spring, a whistle on the outer end of the plunger casing, and a flexible bulb on the casing inclosing the outer end thereof and said whistle and adapted to be inflated and finally ruptured by escaping tire air pressure.

9. The combination with a pneumatic tire inflation valve and the casing thereof, of low pressure signaling devices associated with the valve and comprising a casing connected to the outer end of the valve casing, a plunger operable in its casing in line with the valve and adapted to actuate the latter when the tire pressure falls below a predetermined amount, a spring for operating the plunger, a screw nut on the plunger casing for adjusting the tension of the spring, a whistle on the outer end of the plunger casing, a flexible bulb on the casing inclosing the outer end thereof and said whistle and adapted to be inflated and finally ruptured by escaping tire air pressure, a removable cap inclosing and reinforcing the bulb having an opening through which a portion of the latter is exposable, and a nut threaded to the valve casing having threads on its exterior for the engagement of said cap.

In testimony whereof I affix my signature.

WILLARD F. DOWNS.